(12) United States Patent
Holness et al.

(10) Patent No.: US 10,122,619 B2
(45) Date of Patent: *Nov. 6, 2018

(54) RESILIENT DUAL-HOMED DATA NETWORK HAND-OFF

(71) Applicant: Ciena Corporation, Hanover, MD (US)

(72) Inventors: Marc Holness, Ottawa (CA);
Wei-Chiuan Chen, San Jose, CA (US);
Asheesh Jadav, Santa Clara, CA (US)

(73) Assignee: Ciena Corporation, Hanover, MD (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/687,822

(22) Filed: Aug. 28, 2017

(65) Prior Publication Data
US 2017/0359249 A1 Dec. 14, 2017

Related U.S. Application Data

(63) Continuation of application No. 14/105,908, filed on Dec. 13, 2013, now Pat. No. 9,769,058.

(51) Int. Cl.
*H04L 12/707* (2013.01)
*H04L 12/24* (2006.01)
*H04L 12/703* (2013.01)

(52) U.S. Cl.
CPC .......... *H04L 45/22* (2013.01); *H04L 41/0659* (2013.01); *H04L 45/28* (2013.01); *H04L 41/0806* (2013.01)

(58) Field of Classification Search
None
See application file for complete search history.

(56) References Cited

U.S. PATENT DOCUMENTS

| | | |
|---|---|---|
| 6,279,119 B1 | 8/2001 | Bissett et al. |
| 7,345,991 B1 | 3/2008 | Shabtay et al. |
| 2002/0010770 A1 | 1/2002 | Ueno et al. |
| 2002/0186654 A1 | 12/2002 | Tornar |
| 2003/0048501 A1 | 3/2003 | Guess et al. |
| 2003/0088698 A1 | 5/2003 | Singh et al. |
| 2005/0100024 A1 | 5/2005 | Liu et al. |
| 2005/0281204 A1 | 12/2005 | Karol et al. |
| 2006/0004935 A1 | 1/2006 | Seto et al. |
| 2006/0209895 A1 | 9/2006 | Hirota |
| 2008/0159311 A1* | 7/2008 | Martinotti ............... H04L 45/00 370/401 |
| 2008/0172497 A1* | 7/2008 | Mohan ................ H04L 12/4616 709/249 |
| 2008/0225695 A1 | 9/2008 | Balus et al. |

(Continued)

*Primary Examiner* — Hassan A Phillips
*Assistant Examiner* — Gautam Sharma
(74) *Attorney, Agent, or Firm* — Clements Bernard Walker PLLC; Christopher L. Bernard; Lawrence A. Baratta, Jr.

(57) ABSTRACT

Systems and methods for L2 Ethernet resilient hand-off include an access network configured between a first end point and a second end point, a first communication path and a second communication path for data flow between the first end point and the second end point, wherein the first communication path is active and the second communication path is inactive, and if a fault is detected in the first communication path, logic configured to activate the second communication path and perform a resilient hand-off of the data flow from the first communication path to the second communication path.

17 Claims, 7 Drawing Sheets

(56) References Cited

U.S. PATENT DOCUMENTS

| | | |
|---|---|---|
| 2009/0201937 A1 | 8/2009 | Bragg et al. |
| 2009/0213725 A1 | 8/2009 | Kibel et al. |
| 2010/0054135 A1 | 3/2010 | Rahman et al. |
| 2010/0208595 A1 | 8/2010 | Zhao et al. |
| 2012/0063465 A1 | 3/2012 | Keesara et al. |
| 2012/0076107 A1 | 3/2012 | Avital et al. |
| 2013/0016606 A1 | 1/2013 | Cirkovic et al. |
| 2014/0029418 A1 | 1/2014 | Jain et al. |

* cited by examiner

RESILIENT DUAL-HOMED DATA NETWORK HAND-OFF

CROSS-REFERENCE TO RELATED APPLICATIONS

The present Application for Patent is a continuation of U.S. patent application Ser. No. 14/105,908, filed Dec. 13, 2013, and entitled "RESILIENT DUAL-HOMED DATA NETWORK HAND-OFF," which claims the benefit of U.S. Provisional Application No. 61/824,823, entitled "L2 (ETHERNET) DUAL-HOMED RESILIENT HAND-OFF TECHNIQUE," filed May 17, 2013, assigned to the assignee hereof, and each is expressly incorporated herein by reference in its entirety.

FIELD OF THE DISCLOSURE

Disclosed embodiments relate to resilient hand-off in data networks, and more particularly, exemplary embodiments are directed to resilient dual-homed hand-off solutions between disparate network domains, wherein the hand-off solutions are independent of technologies in the network domains.

BACKGROUND

In the deployment of networks, such as, data networks or packet data networks, there are commonly encountered scenarios which involve the need for hand-off of network traffic. For example, an access network (e.g., via an Ethernet based level 2 (L2) transport network, such as G.8032, MPLS-TP, etc.) may need to aggregate client traffic and resiliently hand-off to a Metro/Core (IP/MPLS) network domain. Resilient hand-off may be accomplished by a multi-homed (e.g. dual-homed) approach wherein the multi-homed network is served by more than one internet service provider (ISP) or has multiple interfaces with one or more internet protocol (IP) address, such that when one link (e.g. one of the upstream or downstream links) fails, traffic is not sent on the failed link.

Conventional resilient hand-off techniques can include a virtual router redundancy protocol (VRRP), which is a computer networking protocol that provides for the automatic assignment of available IP routers to participating hosts. VRRP can increase the availability and reliability of routing paths via automatic default gateway selections on an IP sub-network. VRRP is typically employed by routers (e.g. core routers) to provide hand-off resiliency. However, conventional approaches, such as VRRP, are limited in that they marginalize the value proposition that can be provided by the L2 transport network (e.g., in the access network). The conventional approaches also fail to provide flexible and technology independent solutions for resilient hand-off.

Moreover, due to organization partitioning in networks (e.g., data vs. transport), it is desirable for transport organizations to control the resilient hand-off mechanism provided by their network.

SUMMARY

Exemplary embodiments of the proposed solution are directed to systems and method for resilient multi-homed, such as dual-homed, hand-off solutions between disparate network domains, wherein the embodiments may be independent of technologies used with each network domain. Embodiments may be configured to ensure that given a set of two or more access points (e.g., ports, interfaces, sub-ports, etc.), only a subset of one or more access interfaces, related to the two or more access points, are active, while at least one of the access interfaces is inactive, in order to provide resiliency. Accordingly, in the event of a fault on one of the active interfaces, the at least one inactive interface is activated, and thus, can be used for client traffic flows. For example, in a given set of two access interfaces, embodiments are configured to ensure that only one of the two access interfaces is active and the other access interface is inactive. In the event of a fault on the active access interface, the inactive interface is activated and thus can be used for client traffic flows. Flexible signaling mechanisms which are compatible with various known technologies can be used for effecting the above exemplary resilient handoff solutions. An exemplary access network can be configured to implement exemplary techniques in a technology independent manner.

Some embodiments allow organizational control for transport organizations to control resilient hand-off provided by their network, taking into account organization partitioning between data and transport networks. Configurations of exemplary embodiments may be applied over any L2 technology that supports an Ethernet interface to the dual-homed hand-off interfaces. Exemplary techniques can be used as an overlay over other known network domain technologies (e.g., MPLS/MPLS-TP, G.8032, xSTP, VPLS, etc.), and accordingly, exhibit advantageous ease of network deployment without being limited to particular network technologies.

Moreover, exemplary embodiments may be configured to leverage existing standards-compliant building blocks (e.g. according to IEEE 802.1ag standard), in support of the exemplary resilient hand-off techniques, while providing programmability of the resilient hand-off capability signaling, thus allowing the embodiments to successfully interact with the capabilities of existing deployed network equipment (e.g., core routers or customer-premises equipment/customer-provided equipment (CPE)). More particularly, the functionality of exemplary embodiments can be adapted to known or pre-existing network elements (e.g., routers) of pre-existing networks. Some embodiments can accordingly provide a resilient (dual-homed) hand-off between a pre-existing setup between a CPE and an access network.

Accordingly, an exemplary embodiment is directed to a method of performing resilient dual-homed hand-off, the method comprising configuring an access network between a first end point and a second end point, activating a first communication path for data flow between the first end point and the second end point and deactivating a second communication path between the first end point and the second end point, and if a fault is detected in the first communication path, activating the second communication path and performing a resilient hand-off of the data flow from the first communication path to the second communication path.

Another exemplary embodiment is directed to a system comprising: an access network between a first end point and a second end point, means for activating a first communication path for data flow between the first end point and the second end point and means for deactivating a second communication path between the first end point and the second end point, and if a fault occurs in the first communication path, means for detecting the fault, means for activating the second communication path and means performing a resilient hand-off of the data flow from the first communication path to the second communication path.

Yet another exemplary embodiment is directed to an apparatus for resilient dual-homed hand-off, the apparatus comprising: an access network configured between a first end point and a second end point, a first communication path and a second communication path for data flow between the first end point and the second end point, wherein the first communication path is active and the second communication path is inactive, and if a fault is detected in the first communication path, logic configured to activate the second communication path and perform a resilient hand-off of the data flow from the first communication path to the second communication path.

BRIEF DESCRIPTION OF THE DRAWINGS

The accompanying drawings are presented to aid in the description of embodiments of the proposed solution and are provided solely for illustration of the embodiments and not limitation thereof.

DETAILED DESCRIPTION

Figure 1A:
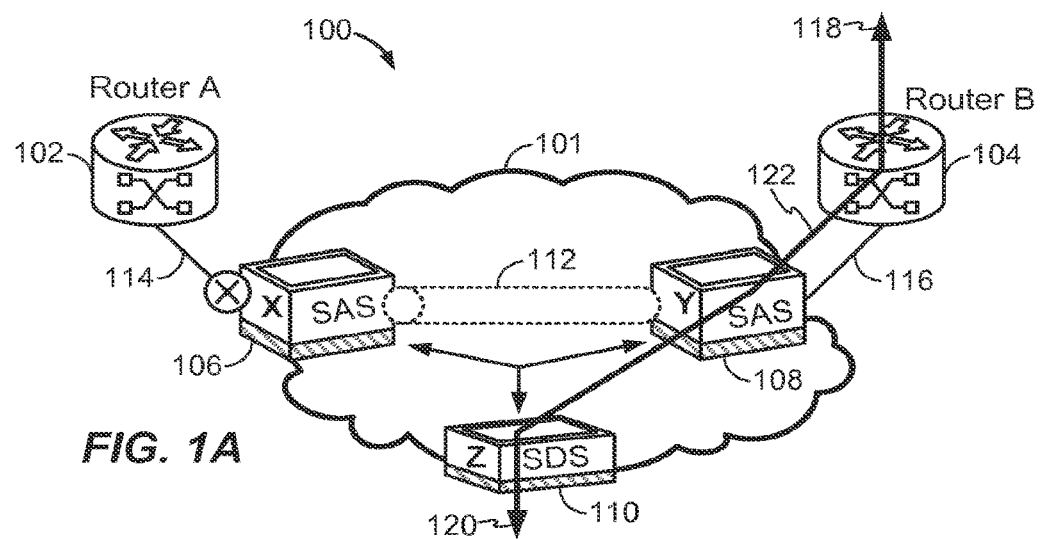
FIGS. 1A-C illustrate an exemplary embodiment related to dual-homed hand-off in a system comprising an L2 Ethernet network according to a first scenario.

Aspects of the invention are disclosed in the following description and related drawings directed to specific embodiments of the invention. Alternate embodiments may be devised without departing from the scope of the invention. Additionally, well-known elements of the invention will not be described in detail or will be omitted so as not to obscure the relevant details of the invention.

The word "exemplary" is used herein to mean "serving as an example, instance, or illustration." Any embodiment described herein as "exemplary" is not necessarily to be construed as preferred or advantageous over other embodiments. Likewise, the term "embodiments of the invention" does not require that all embodiments of the invention include the discussed feature, advantage or mode of operation.

The terminology used herein is for the purpose of describing particular embodiments only and is not intended to be limiting of embodiments of the invention. As used herein, the singular forms "a," "an," and "the" are intended to include the plural forms as well, unless the context clearly indicates otherwise. It will be further understood that the terms "comprises," "comprising," "includes," and/or "including", when used herein, specify the presence of stated features, integers, steps, operations, elements, and/or components, but do not preclude the presence or addition of one or more other features, integers, steps, operations, elements, components, and/or groups thereof.

Further, many embodiments are described in terms of sequences of actions to be performed by, for example, elements of a computing device. It will be recognized that various actions described herein can be performed by specific circuits (e.g., application specific integrated circuits (ASICs)), by program instructions being executed by one or more processors, or by a combination of both. Additionally, these sequence of actions described herein can be considered to be embodied entirely within any form of computer readable storage medium having stored therein a corresponding set of computer instructions that upon execution would cause an associated processor to perform the functionality described herein. Thus, the various aspects of the proposed solution may be embodied in a number of different forms, all of which have been contemplated to be within the scope of the claimed subject matter. In addition, for each of the embodiments described herein, the corresponding form of any such embodiments may be described herein as, for example, "logic configured to" perform the described action.

In one aspect, exemplary embodiments may be configured for resilient (e.g. dual-homed) hand-off solutions between disparate network domains, wherein among access interfaces related to given set of access points, only a single access interface may be allowed to be active. The remaining access interfaces may be maintained inactive. In the event of a fault on the active interface, one or more of the inactive access interfaces can be activated, and thus can be used for client traffic flows. In more general aspects, at least one access interface is maintained inactive while remaining access interfaces of a network can be active, thus providing resiliency through the inactive access interface when one of the remaining active access interfaces develop a fault. Various messaging functions or protocols can be used to communicate information between the interfaces, regarding faults and activity. In some cases, an access network comprising the access interfaces can implement or support the messaging functions. Activating/deactivating access interfaces can be based on the messaging functions. While a set of two access interfaces in several usage scenarios will be discussed in illustrative embodiments below to highlight some of the inventive aspects, it will be understood that the exemplary techniques can be extended to any number of access interfaces and/or usage scenarios without departing from the scope of this disclosure. Similarly, some exemplary embodiments are described with regard to resilient hand-off between two access interfaces in a dual-homed network. However, embodiments are not limited to dual-homed networks as such, and are easily extendable to any multi-homed access network with resiliency provided through at least one access network maintained inactive. Similarly, while embodiments are generally described with regard to access networks configured according to L2 Ethernet, exemplary embodiments are applicable to any data access network, with wired or wireless access interfaces.

Exemplary embodiments will be described below with regard to the figures and various usage scenarios where particular embodiments, configurations, and variations may be applied.

Figure 1B:
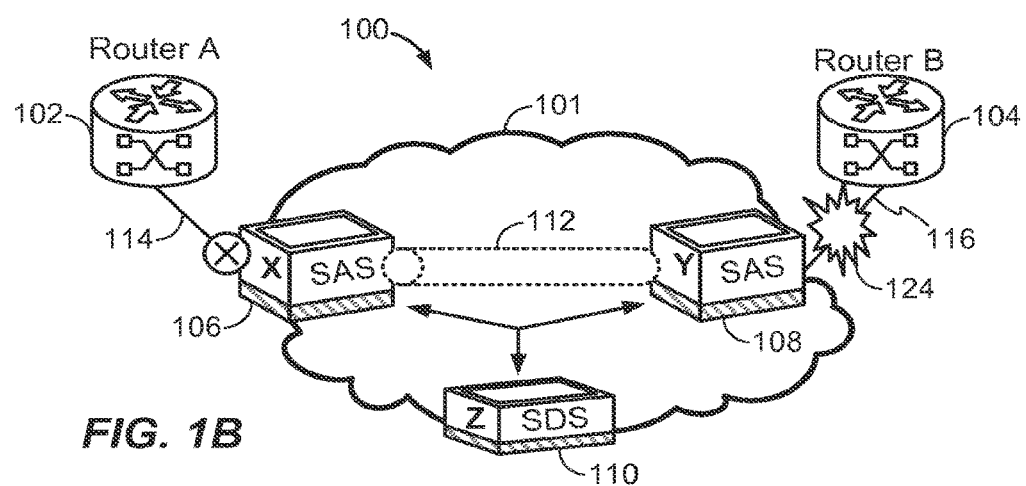
Figure 1C:
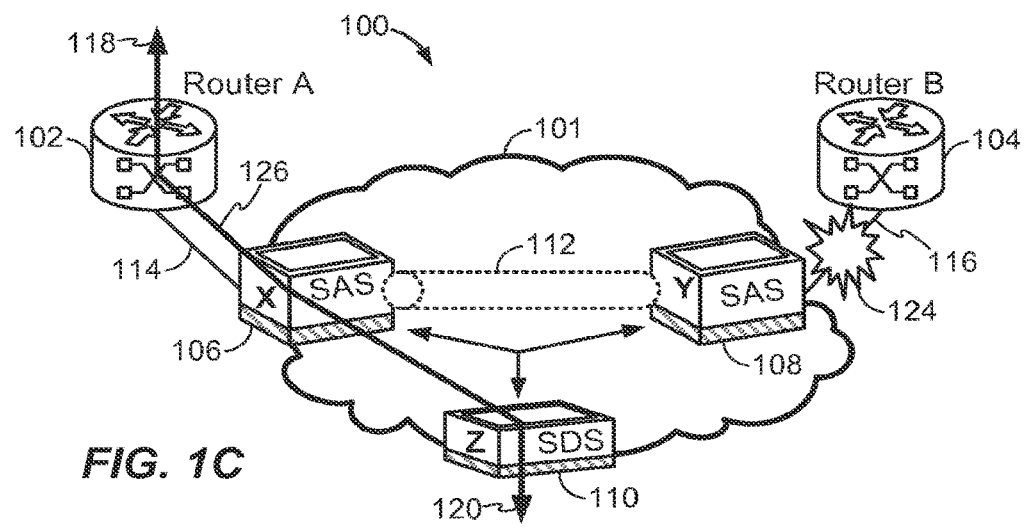

With reference to FIGS. 1A-C, an exemplary embodiment pertaining to system 100 with regard to a first use case or scenario is illustrated. System 100 may comprise a dual-homed L2 Ethernet network, for example. Within system 100, is shown access network 101, which may be configured to implement aspects of exemplary embodiments in a technology independent manner. Access network 101 may be deployed between ends 118 and 120, which may be connected to any network, system, or device, without limitation. In one example, end 118 may be connected to a user's home network, and end 120 may be connected to the Internet, such that access network 101 may provide path 122 for communication between the user's home network and the Internet. As such, system 100 may include routers A 102 and B 104, and access network 101 may include customer edge (CE) devices X 106 and Y 108, which may be, for example, routers or Ethernet switches, as well as, device Z 110. Routers A 102 and B 104 may be connected or connectable to devices X 106 and Y 108 respectively.

According to an exemplary aspect, access network 101 may be set up to correspond to initial conditions depicted in FIG. 1A, wherein, a path or interface BY 116 between router B 104 and device Y 108 is active. Communication path 122 is thus enabled between ends 118 and 120 through interface BY 116 which is connected to device Z 110. Correspondingly, interface AX 114 is made inactive. Device X 106 may be configured to signal to router A 102 that interface AX 114 is inactive. With respect to device Y 108, device X is a remote device and vice versa. Devices X 106 and Y 108 can signal or communicate with one another through communication channel 112. Communication channel 112 can be based on any suitable technology or medium which can support signaling between the remote devices. In exemplary aspects, communication channel 112 is implemented by or supported by the access network 101. Pre-established signaling protocols may be employed for signaling between the two remote devices, X 106 and Y 108, wherein such signaling can convey information pertaining to statuses or activity states of corresponding interfaces AX 114 and BY 116. Exemplary configurations of communication channels, such as communication channel 112, and corresponding signaling or messaging functions will be discussed in later sections of this disclosure. In this example, device Y 108 can signal on communication channel 112 to remote device X 106 that interface BY 116 is active, such that remote device X 106 can deactivate remote interface AX 114.

Referring now to FIG. 1B, fault 124 is illustrated as having developed in interface BY 116. Fault 124 may pertain to any type of soft or hard failure which could cause communication between router B 104 and device Y 108 to be interrupted, thus disrupting path 122. However, there is a need to maintain communication between ends 118 and 120, and thus, a resilient hand-off needs to occur quickly to an active interface so that communication may resume. Exemplary embodiments facilitate such a quick hand-off as illustrated in FIG. 1C.

With reference to FIG. 1C, fault 124 is communicated to remote device X 106 by device Y 108 that interface BY 116 is inactive. This causes device X 106 to activate the communication port which will enable interface AX 114 to become active, between device X 106 and router A 102. Accordingly, alternative path 126 is now created between ends 118 and 120, through interface AX 114 and device Z 110. Thus, a resilient hand-off is accomplished in one embodiment. In optional aspects, once fault 124 is repaired, a similar process may be utilized to return the communication to path 122. In contrast to the above exemplary embodiments, conventional implementations may require routers A 102 and B 104 to adopt a VRRP protocol, which would require assigning a master router, and involve complexities and time delays described in previous sections. In the present embodiments, access network 101 does not need to implement a layer 3 (L3) protocol or be specifically tied to any technology. In some aspects exemplary access network 101 can be configured to overlay existing network hardware and implement the exemplary hand-off techniques without requiring any hardware changes.

Figure 2A:
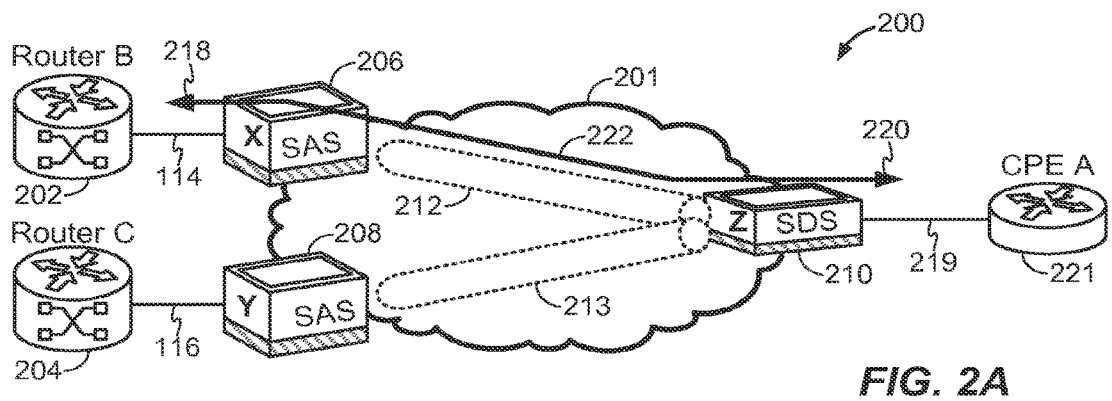
FIGS. 2A-C illustrate an exemplary embodiment related to dual-homed hand-off in a system comprising an L2 Ethernet network according to a second scenario.
Figure 2B:
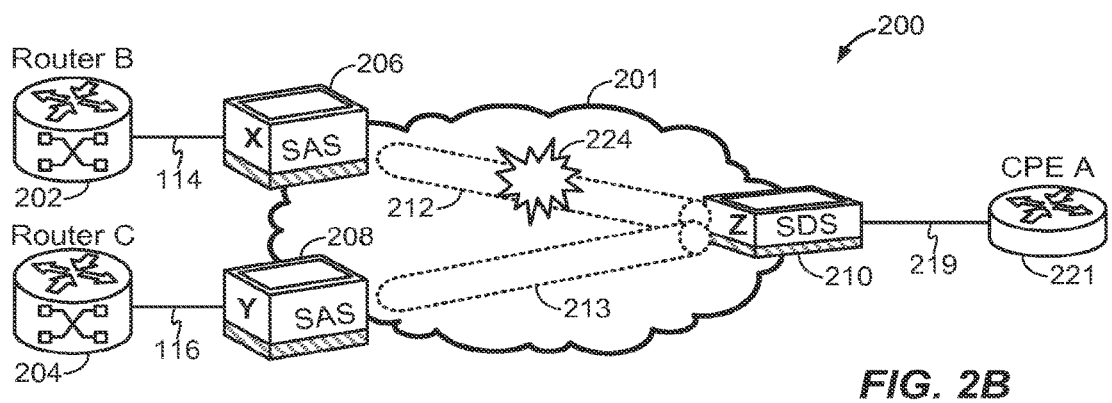
Figure 2C:
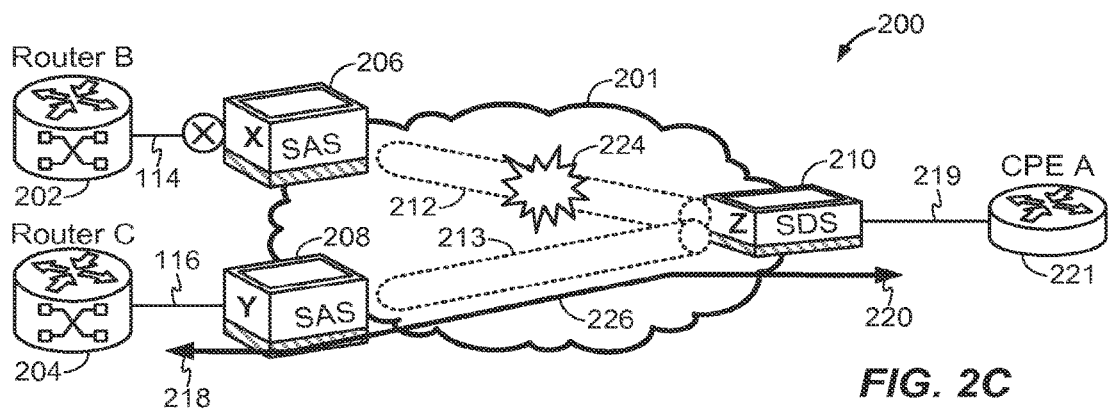

Referring now to FIGS. 2A-C, system 200 configured for resilient dual-homed hand off according to exemplary embodiments is illustrated, corresponding to a second use case or scenario. System 200 is similar in some aspects to system 100 of FIGS. 1A-C, and the common characteristics will not be repeated in detail, for the sake of brevity. Briefly, system 200 comprises access network 201 which enables communication between ends 218 and 220. In this case, one of two routers B 202 and C 204 can be connected to end 218 for providing resiliency, and CPE device A 221 can be connected to end 220. Depending on which of the two routers is enabled, the active router can be designated as the "master" router. CE devices X 206 and Y 208 may be connected or connectable to routers B 202 and C 204, through interfaces BX 114 and CY 116 respectively, and device Z 210 can be connected to device A 221 through interface 219.

In the initial conditions depicted in FIG. 2A, router B 202 is the master router. Communication path 222 is established between ends 218 and 220, comprising active interface BX 114 with device X 206 coupled to device Z 210 via channel 212. Communication path 222 may be implemented according to L2 Ethernet technology, for example. Access network 201 can implement or manage channel 212. Access network 201 can also implement or manage channel 213 between device Y 208 and device Z 210. Since interface BX 114 and channel 212 are active, to facilitate path 222, access network 201 ensures that channel 213 remains inactive.

With reference to FIG. 2B, fault 224 occurs in channel 212. Once again, fault 224 may be any type of hard or soft failure which may disrupt communication on channel 212. Thus, a need arises for quickly handing off communication through path 222 to an alternative path in order to ensure that communication between ends 218 and 220 can resume. In exemplary implementations, access network 201 is not router-aware, in the sense that access network 201 can perform the hand-off to a different router without requiring a master router or VRRP techniques to control the hand-off.

Referring to FIG. 2C, access network 201 activates or enables channel 213 based on fault 224 in channel 212. Additionally, device X 206 is configured to signal to router B 202 that interface BX 114 is no longer active. Correspondingly, device Y 208 is configured to signal router C 204 to indicate that interface CY 116 is now active. In one example, a L3 Ethernet protocol, per a VRRP process, which may be running on routers B 202 and C 204 may be kick started based on this indication to negotiate a new master router, router C 204, thus facilitating a faster service restoration. Therefore, in this embodiment, when a fault occurs on the active L2 connection, a previously inactive L2 connection can be made active, thus facilitating a resilient hand-off. Specifically, communication is handed off to path 226, which comprises active interface CY 116 and channel 213, so that end 218 is now connected to router C 204, and communication can resume with end 220. Once again, it is possible, although not necessary, to return communication to path 222 once fault 224 is fixed.

Figure 3A:
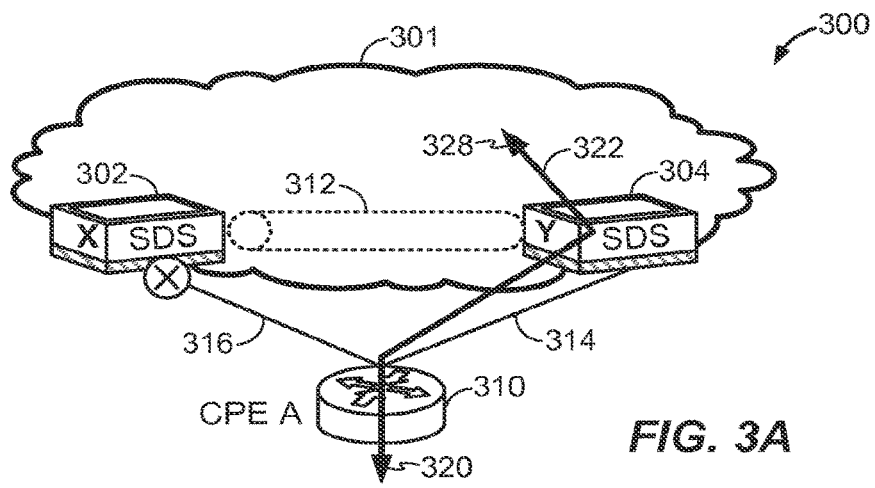
FIGS. 3A-C illustrate an exemplary embodiment related to dual-homed hand-off in a system comprising an L2 Ethernet network according to a third scenario.
Figure 3B:
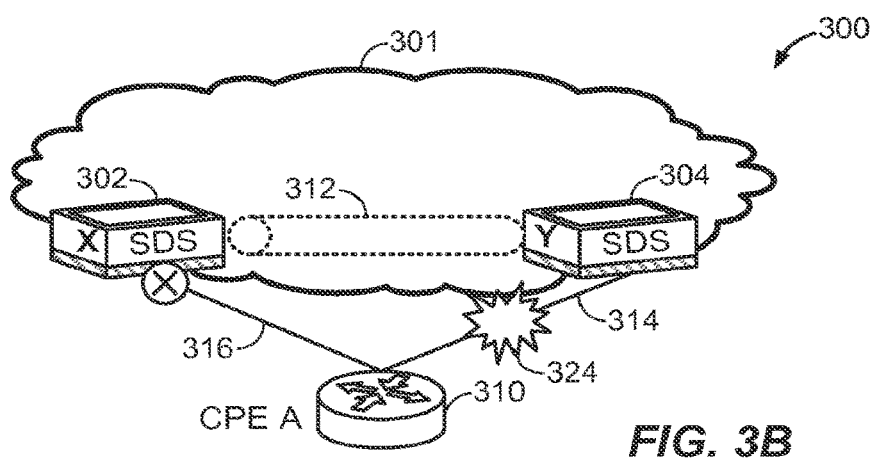
Figure 3C:
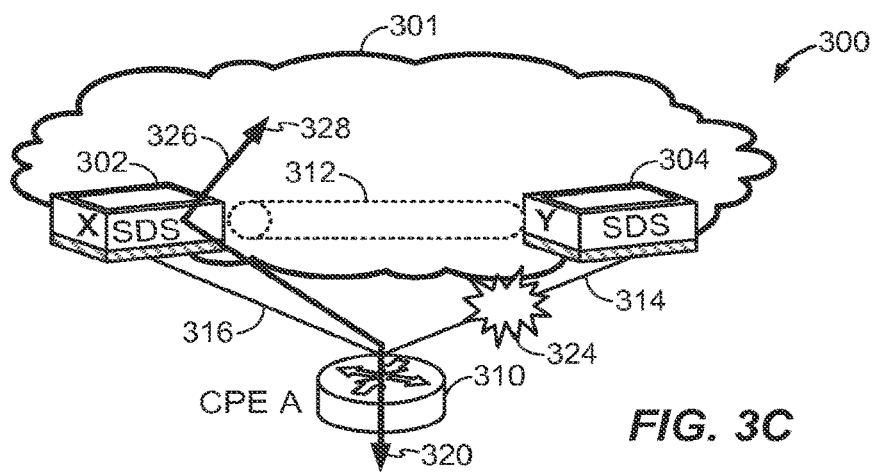

Referring now to FIGS. 3A-C, system 300 pertaining to yet another embodiment for resilient hand-off corresponding to a third use case or scenario, is illustrated. Once again, system 300 is similar to systems 100 and 200 above in several aspects which will not be repeated in detail. In this case, system 300 depicts a general case where access network 301 comprises two devices X 302 and Y 304 connected or connectable to CPE device A 310. Unlike systems 100 and 200, routers and master routers may not be present or necessary for the functioning of exemplary aspects related to system 300. As illustrated, access network 301 may facilitate the connection between ends 328 and 320 through device A 310.

In FIG. 3A, corresponding to initial conditions, access network 301 is configured to provide active interface AY 314 between devices Y 304 and A 310 to enable communication path 322 for data flow between end points or ends 328 and 320. Channel 312 may communicate this activity to device X 302, which may thus disable or deactivate interface AX 316.

With reference to FIG. 3B, interface AY 314 may experience fault 324. Once again, fault 324 may be any type of fault, and in one example, is a user network interface (UNI) fault. Interface AY 314 is thus inactivated, and access network 301 facilitates a hand-off of path 322.

As shown in FIG. 3C, device Y 304 signals the UNI fault 324 to remote device X 302 on channel 312. Remote device X 302 then causes interface AX 316 to be activated and signals to device A that interface AX 316 is active open for communication. Thus, communication path 326 is created to comprise active interface AX 316 and communication is handed off from path 322 to path 326.

The communication on channels, such as 112, 212-213, and 312 discussed above with regard to systems 100-300 can be implemented in several ways to facilitate quick resilient hand-off according to exemplary embodiments. Some exemplary aspects related to such communication channels will now be described.

Figure 4A:
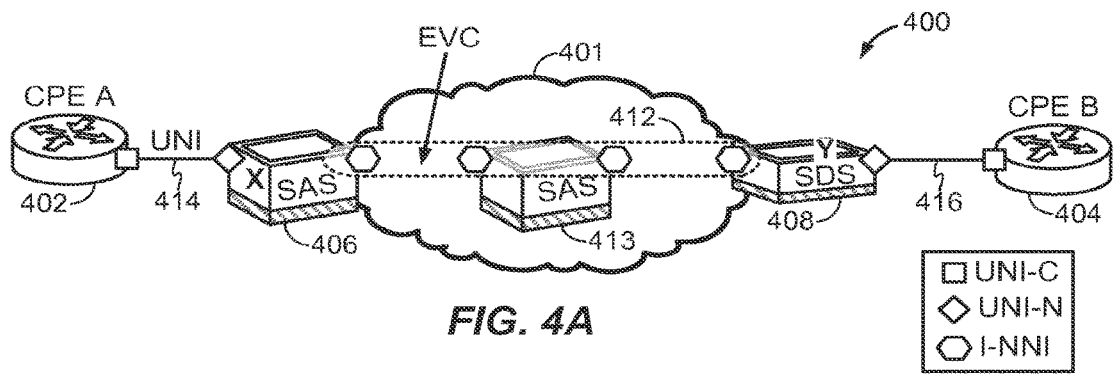
FIGS. 4A-E illustrates an exemplary system comprising an Ethernet virtual connection (EVC) between CE devices and exemplary mechanisms for signaling between them.

With reference to FIG. 4A, system 400 comprising an Ethernet virtual connection (EVC) is illustrated. System 400 can include channel 412, which may be a small computer system interface (SCSI). Several serial attached SCSI (SAS) devices, such as SAS devices 406, 408, and 413 may be present to facilitate data transfer across channel 412. Channel 412 may be part of access network 401. SAS devices 406 and 408 may be coupled to devices A 402 and B 404 on respective ends as illustrated. Devices A 402 and B 404 may be, for example, CPE devices or routers. In general, EVCs may relate to a logical relationship between Ethernet UNIs in a provider-based Ethernet service. As depicted, device A 402 may be connectable via UNI 414 to device X 406 and device B 404 may be connectable to device Y 408 via UNI 416. System 400 implementing EVC, may be formed over any L2 transport network, such as, for example, 802.1Q, 802.1ad (QiQ), 802,1Qay (PBB-TE), G.8032, MPLS/MPLS-TP, LAG, etc.

Figure 4B:
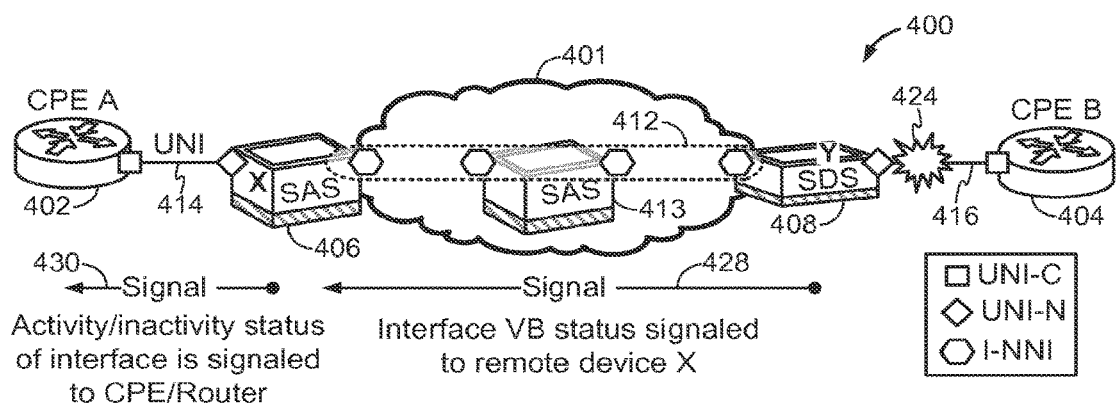
Figure 4C:
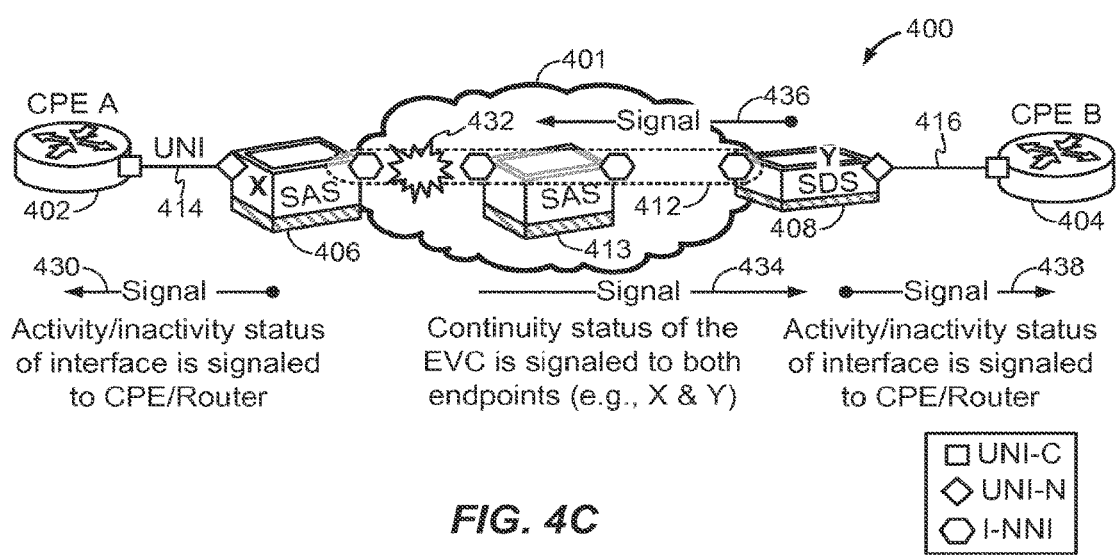

With reference now to FIGS. 4B-C, mechanisms for the various signaling interactions for system 400 are depicted. Continuity check messages (CCMs) and/or physical port status messages can be used for signaling across channel 412. CCMs can provide a means to detect connectivity failures. CCMs can contain interface status type length values (TLVs) that convey the interface status or activity states (e.g., whether the interface is up or down) of the interfaces, UNI 414 and 416, for example. In exemplary embodiments, the type of signaling used to convey activity/inactivity states or status over such interfaces to the CPEs/routers is programmable.

In FIG. 4B, for example, a first type of fault, fault 424 is detected in UNI 416. This fault is conveyed as a status of UNI 416, i.e., an indication that the interface between device B 404 and device Y 408 is down, by signaling remote device X 406 across channel 412, using signal 428. This indication regarding the status of UNI 416 is thereafter conveyed to device A 402 by device X 406, using signal 430.

In FIG. 4C, a second type of fault, fault 432 is shown to arise in channel 412, for example, between SAS devices X 406 and 413. This fault needs to be conveyed in both directions to end points A 402 and B 404. Signal 434 can be used to convey the fault to device Y 408. Signal 438 is similar to signal 430 above and can be used to convey the fault or other activity/inactivity status from device Y 408 to device B 404 on UNI 416. Signal 436 can be used to provide signaling across end point Y 408 and SAS device 413 on the section of channel 412 which is still active despite the fault. Exemplary formats and options for signals, such as signals 428-438 above, will be further described in the following sections.

Figure 4D:
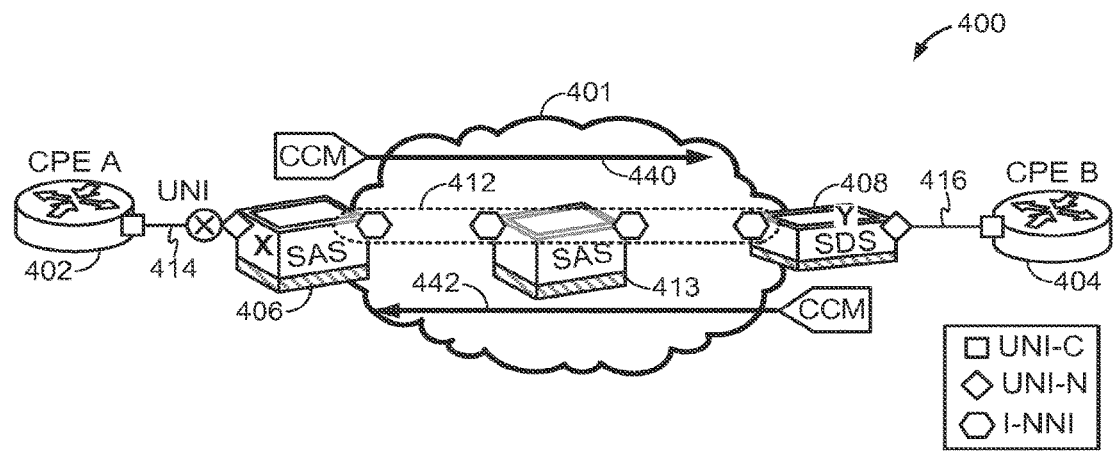
Figure 4E:
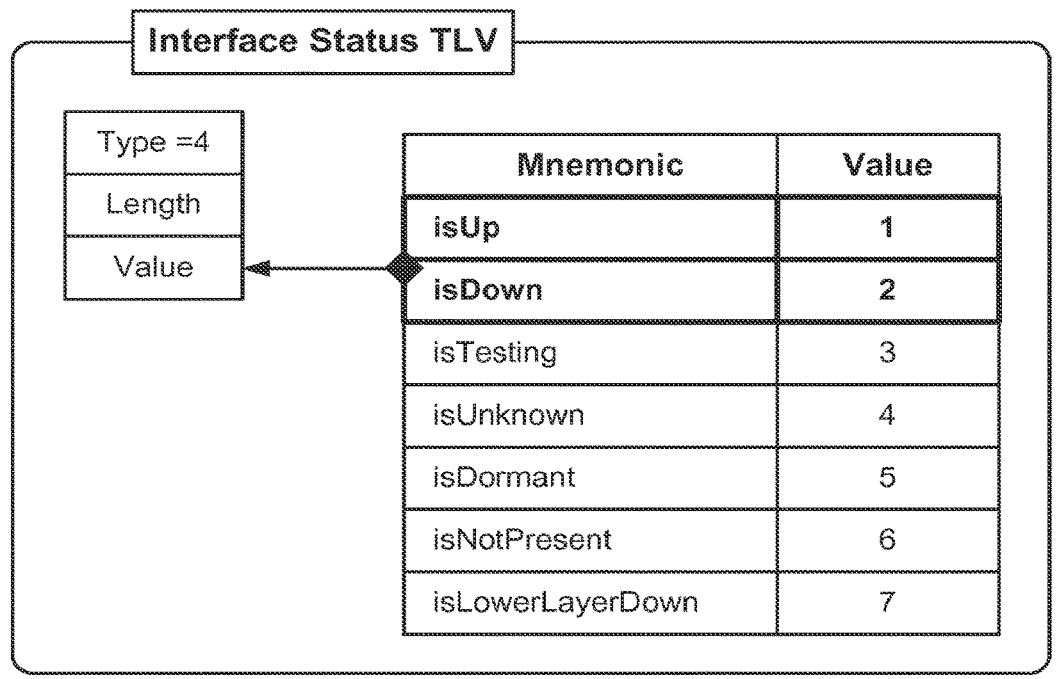

With reference now to FIGS. 4D-E, programming options for signaling across channel 412 in system 400 are depicted. As previously noted, access network 401 may comprise channel 412 (e.g., implementing an EVC) between CE devices X 406 and Y 408. In order to implement exemplary aspects, for example, within access network 401, devices X 406 and Y 408 may be programmed, for example, according to maintenance end point (MEP) IEEE 802.1ag standard. Each MEP can be configured to transmit or receive IEEE 802.1ag CCMs. The status of each MEP can be up or down, which can indicate faults if present. The 802.1ag CCM can contain an interface status type length values (TLVs), as previously mentioned, which can be used to communicate the status of the attachment interfaces, such as, UNI 414 and 416, at the endpoints of channel 412.

Exemplary interface status TLV options for a TLV=4 are enumerated in the table illustrated in FIG. 4E. As shown in the table, status indications, for example, corresponding to whether the related interface is up (active) or down (inactive) can be conveyed using the equivalent encodings "1" and "2" respectively. Various other statuses are depicted in the table and will be understood by one skilled in the art, without further detailed explanation herein.

The devices, such as CE or SAS devices X 406 and Y 408, may themselves need to be programmed in order to support the exemplary signaling formats for effecting exemplary hand-off techniques discussed above. The various programming options which may be used in this regard are enumerated in Table 1 below. In general, the entries in Table 1 provide various forms for signaling active/inactive signals from CE devices to the subtending CPEs/routers (e.g., on interfaces such as UNI 414/416). One skilled in the art may adopt any one or combination of programming options discussed in Table 1 for programming devices within access networks such as 101-401. It will be noticed, for example, from entry 8 of Table 1, that in some cases, a particular signal value need not be transmitted, and not transmitting a signal itself can be used to convey a message in the form of a no-operation or NOP.

TABLE 1

Signaling active/inactive signals to the subtending CPE/router

| | |
|---|---|
| 1 | Physical port Up/Down - > laser on/off |
| 2 | CCM may be programmed/configured over the interface connected to the CPE/router device. Termination of the CCM sessions, or transmission of CCM with remote definition indication (RDI), is an indication of inactivity. Resumption of CCM sessions is an indication of activity |
| 3 | Generation of an Ethernet alarm indication status (ETH-AIS) to the subtending CPE/router could be used as an indication of inactive interface. Lack of ETH-AIS is an indication of activity status. |
| 4 | Interface to the connected CPE/router may be configured according to a link aggregation group (LAG). Utilization of link aggregation control protocol (LACP) signaling may be used to signal that the port member is active/inactive. |
| 5 | Interface to the connected CPE/router may utilize a MPLS/PW |

TABLE 1-continued

Signaling active/inactive signals to the subtending CPE/router

| | |
|---|---|
| | technology. Utilization of PW status indication can be used to indicate an active/inactive interface/sub-port. |
| 6 | Interface to the connected CPE/Router may utilize a multiprotocol labeling switch tunneling protocol (MPLS-TP) technology. Utilization of MPLS-TP client signal fail (CSF) indication can be used to indicate active interface/sub-port. |
| 7 | In general, any signaling mechanism is applicable. |
| 8 | NOP (no-op) is also a viable programmable option, which infers that no signaling is to be taken at the interface connected to the subtending CPE/router |

Figure 4F:
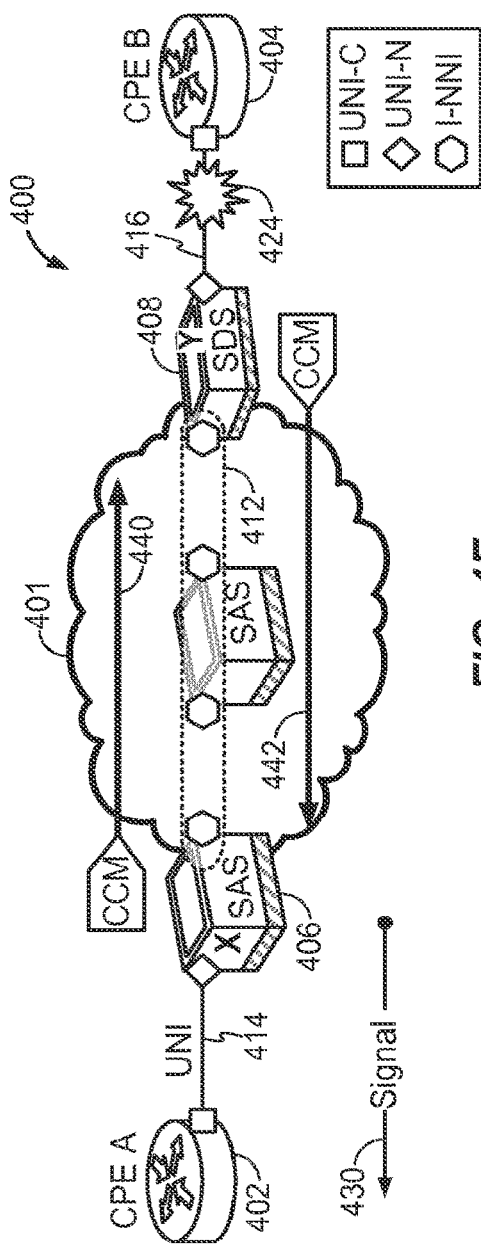
FIGS. 4F-G illustrate a cause and effect view of the exemplary resilient dual-homed hand-off techniques.
Figure 4G:
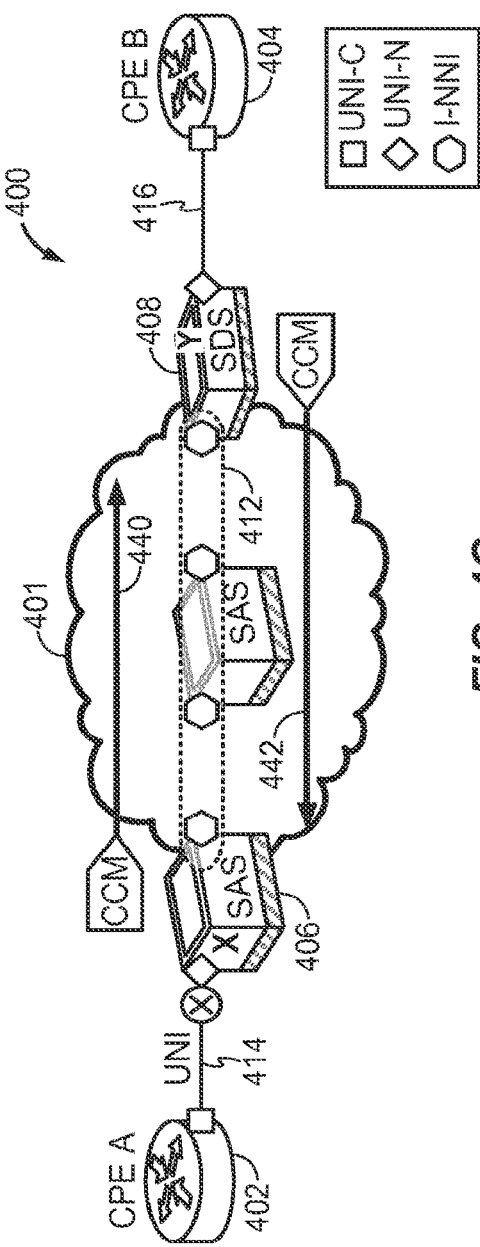

With reference now to FIGS. 4F-G, an alternative depiction of system 400 is illustrated, to convey the cause and effect relationship between fault (event) occurrences and recovery (action) performed in effecting exemplary resilient hand-off techniques. In general, the above signaling mechanisms of FIGS. 4B-C and the programming options for the signals according to the table of FIG. 4E and Table 1 are utilized for fault detection and recovery in terms of hand-off. In one example, device X 406 can be programmed as above, and the corresponding event (e.g., faults) can be communicated over the EVS. Associated actions/signals are conveyed to the subtending interface to the CPE/router A 402.

More specifically, as depicted in FIG. 4F, a receiver (Rx) fault-event (e.g., EVC or remote interface status fault), fault 424, is detected on UNI 416. This fault-event is associated with a recovery-action. Based on the signaling options discussed above, the fault-event, fault 424, may be denoted as a connection fault of the form {CCM timeout, CCM RDI, CCM [remote] Interface Status is Down}. For this connection fault, the corresponding action can be depicted as a signal, signal 430: active interface of the form {port Up, CCM on interface resume, LACP signal member is active, PW status indication of "forwarding," etc.}.

With reference to FIG. 4G, a Rx recovery-event (e.g., EVC or remote interface status recovery) can be associated with an action on interface UNI 414 as shown. For example, the event may be denoted by, Event: EVC recovery of the form {CCM resume, CCM RDI clear, CCM [remote] Interface Status is Up}, and the corresponding action by, Action: Signal inactive interface of the form {port Down, CCM on interface terminated, LACP signal member is inactive, PW status indication of "not forwarding", etc.}.

Accordingly, exemplary techniques can be advantageously deployed independent of, or in conjunction with, existing technology used within disparate network domains requiring resilient hand-off. As previously noted, embodiments may be applied, independent of particular technologies in the different network domains. With advantageous characteristics such as compatibility with existing standards-compliant building blocks, programmability of the resilient hand-off signaling, and capability of a resilient (e.g. dual homed hand-off between a CPE to an access network, exemplary embodiments offer significant advantages and improvements over conventional solutions which may include VRRP or BGP multi-homing in the level 3 (L3) IP space and multi-chassis LAG, G.8032 sub-rings, xSTP, VPLS, MPLS, etc., in the L2 (Ethernet) space, which suffer from limitations such as, requiring interconnected domains to be restricted to supported technology.

Figure 5:
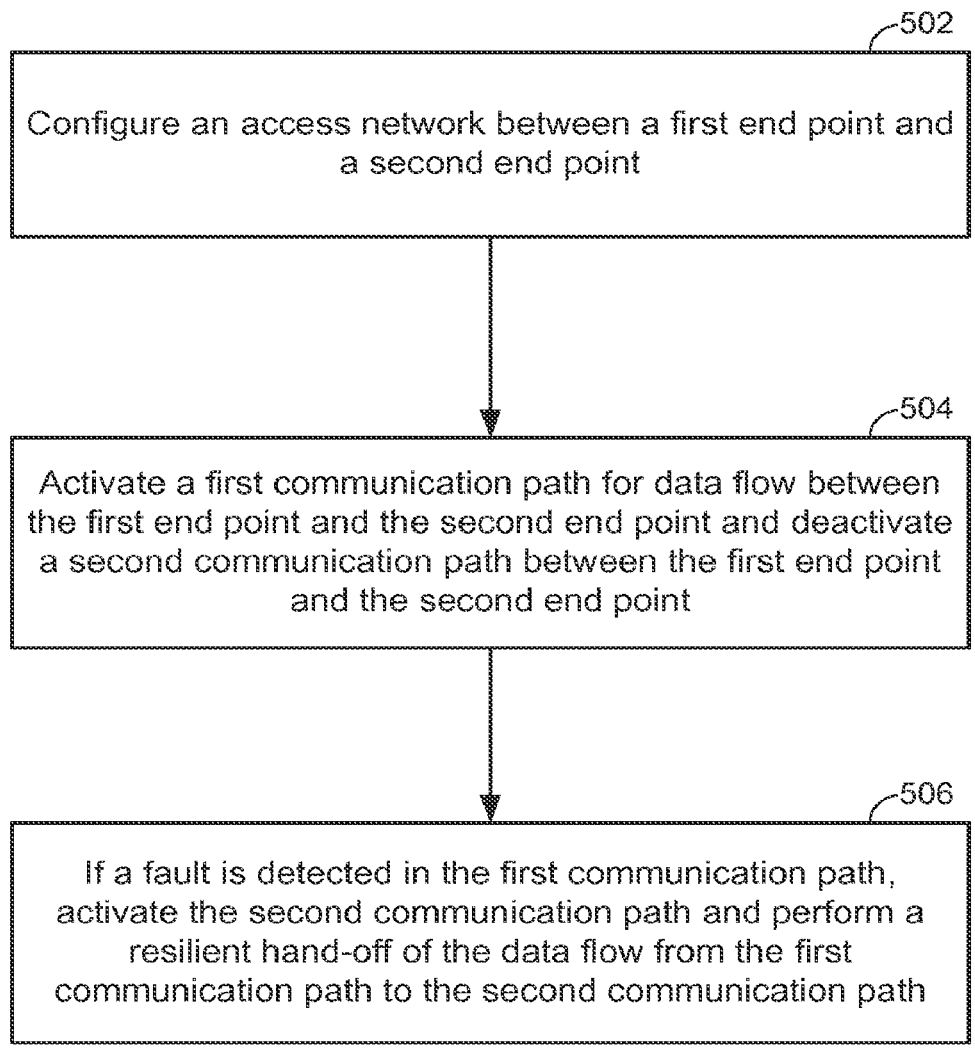
FIG. 5 illustrates a flow chart of sequences in an exemplary resilient hand-off.

It will be appreciated that embodiments include various methods for performing the processes, functions and/or algorithms disclosed herein. For example, as illustrated in FIG. 5, an embodiment can include a method of performing resilient dual-homed hand-off, the method comprising: configuring an access network (e.g., access network 301) between a first end point (e.g., end point 328) and a second end point (e.g., end point 320)—Block 502; activating a first communication path (e.g., communication path 322) for data flow between the first end point and the second end point and deactivating a second communication path (e.g., communication path 326) between the first end point and the second end point—Block 504; and if a fault (e.g., fault 324) is detected in the first communication path, activating the second communication path and performing a resilient hand-off of the data flow from the first communication path to the second communication path—Block 506.

In some aspects, the method can further include configuring the access network as an L2 Ethernet network and configuring the first and second communication paths using small computer system interface (SCSI) channels, wherein the fault is a user network interface (UNI) fault. Moreover, as described above with relation to FIGS. 1A-C, some embodiments may include comprising configuring the first communication path to comprise a first customer edge (CE) device (e.g., CE device 106), and a third device (e.g., CE device 110), and the second communication path to comprise a second CE device (e.g., CE device 108) and the third device; wherein the first CE device is connectable to a first customer-provided equipment (CPE) device (e.g., CPE device or router A 102) through a first interface (e.g., interface AX 114), the second CE device is connectable to a second customer-provided equipment (CPE) device (e.g., CPE device or router B 104) through a second interface (e.g., interface BY 116). In some aspects, for example, according to FIG. 2, the third device can be coupled to a third customer-provided equipment (CPE) device (e.g., CPE or router 221). Further, in some aspects, for example, as illustrated in FIGS. 4A-G, the method can further comprise configuring the access network for signaling between the first CE device and the second CE device using pre-established and technology independent signals on a first communication channel, signaling between the first CE device and the third CE device on a second communication channel, and signaling between the second CE device and the third CE device on a third communication channel, wherein signaling on the first communication channel using continuity check messages to convey activity states of the second communication channel and the third communication channel.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those of skill in the art will appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The methods, sequences and/or algorithms described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor.

Accordingly, an embodiment of the invention can include a computer readable media embodying a method for L2 Ethernet resilient hand-off. Accordingly, the invention is not limited to illustrated examples, and any means for performing the functionality described herein are included in embodiments of the invention.

While the foregoing disclosure shows illustrative embodiments of the invention, it should be noted that various changes and modifications could be made herein without departing from the scope of the invention as defined by the appended claims. The functions, steps and/or actions of the method claims in accordance with the embodiments of the invention described herein need not be performed in any particular order. Furthermore, although elements of the invention may be described or claimed in the singular, the plural is contemplated unless limitation to the singular is explicitly stated.

What is claimed is:

1. A device in an access network configured to perform a resilient dual-homed hand-off, the device comprising:
    a first port connected to a subtending router in a separate network domain from the access network, wherein the separate network domain utilizes a first protocol; and
    a second port connected to the access network and configured to transmit and receive status messages in a second protocol associated with the access network which is different from the first protocol,
    wherein the status messages convey one or more of activity/inactivity and status of the first port over the second port to a second device configured for the resilient dual-homed hand-off independent of particular technologies in the access network and the separate network domain utilizing programming between the first protocol and the second protocol to convey the one or more of activity/inactivity and status of the first port in the first protocol over the second protocol.

2. The device of claim 1, wherein the second port is configured as a Maintenance End Point (MEP) in the access network and configured to transmit and receive Continuity Check Messages (CCMs) for the status messages.

3. The device of claim 1, wherein the device is further configured to receive signaling from the subtending router related to the one or more of activity/inactivity and status.

4. The device of claim 1, wherein the first port uses one of a Link Aggregation Group (LAG), Multi-Protocol Label Switching (MPLS), and MPLS-Transport Profile (MPLS-TP), Pseudowire (PW), and the access network utilizes Ethernet.

5. The device of claim 1, wherein the status messages comprise Type Length Value (TLVs) which are programmed in the device, the subtending router, and a second device in the access network providing the resilient dual-homed hand-off.

6. The device of claim 1, wherein the status messages are over an Ethernet Virtual Circuit connected between the device and the second device in the access network.

7. A method of performing resilient dual-homed hand-off implemented by a device in an access network, the method comprising:
    communicating over a first port with a subtending router in a separate network domain from the access network, wherein the separate network domain utilizes a first protocol;
    transmitting and receiving status messages in a second protocol associated with the access network, which is different from the first protocol, over a second port connected to the access network; and
    conveying one or more of activity/inactivity and status of the port to a second device configured for the resilient dual-homed hand-off, wherein the status messages are independent of particular technologies in the access network and the separate network domain and utilize programming between the first protocol and the second protocol to convey the one or more of activity/inactivity and status of the first port in the first protocol over the second protocol.

8. The method of claim 7, wherein the second port is configured as a Maintenance End Point (MEP) in the access network and configured to transmit and receive Continuity Check Messages (CCMs) for the status messages.

9. The method of claim 7, further comprising receiving signaling from the subtending router related to the one or more of activity/inactivity and status.

10. The method of claim 7, wherein the first port uses one of a Link Aggregation Group (LAG), Multi-Protocol Label Switching (MPLS), and MPLS-Transport Profile (MPLS-TP), Pseudowire (PW), and the access network utilizes Ethernet.

11. The method of claim 7, wherein the status messages comprise Type Length Value (TLVs) which are programmed in the device, the subtending router, and a second device in the access network providing the resilient dual-homed hand-off.

12. The method of claim 7, wherein the status messages are over an Ethernet Virtual Circuit connected between the device and the second device in the access network.

13. An access network configured for resilient dual-homed hand-off, the access network comprising:
    a first device connected to a first subtending router in a first separate domain from the access network, wherein the separate network domain utilizes a first protocol and the access network utilizes a second protocol different from the first protocol; and
    a second device connected to a second subtending router in a second separate domain from the access network, wherein status messages between the first device and the second device over the access network convey one or more of activity/inactivity and status of the first subtending router and the second subtending router for the resilient dual-homed hand-off independent of particular technologies in the access network, the first separate network domain, and the second separate domain utilizing programming between the first protocol and the second protocol to convey the one or more of activity/inactivity and status of the first subtending router in the first protocol over the second protocol.

14. The access network of claim 13, wherein the first device and the second device are each configured as a Maintenance End Point (MEP) in the access network and configured to transmit and receive Continuity Check Messages (CCMs) for the status messages.

15. The access network of claim 13, wherein the first device and the second device are each further configured to receive signaling from the first subtending router and the second subtending router, respectively, related to the one or more of activity/inactivity and status.

16. The access network of claim 13, wherein the first subtending router and the second subtending router use one of a Link Aggregation Group (LAG), Multi-Protocol Label Switching (MPLS), and MPLS-Transport Profile (MPLS-TP), Pseudowire (PW), and the access network utilizes Ethernet.

17. The access network of claim 13, wherein the status messages comprise Type Length Value (TLVs) which are programmed in the first device, the second device, the first subtending router, and the second subtending router for providing the resilient dual-homed hand-off.

* * * * *